(12) United States Patent
Elbaz et al.

(10) Patent No.: US 11,448,349 B2
(45) Date of Patent: Sep. 20, 2022

(54) UNIVERSAL HOSE COUPLING ADAPTER

(71) Applicant: SUPERFLEX, LTD., Elizabeth, NJ (US)

(72) Inventors: Gil Elbaz, Neponsit, NY (US); Michael Elbaz, New York, NY (US); Jason Elbaz, Neponsit, NY (US)

(73) Assignee: SUPERFLEX, LTD., Elizabeth, NJ (US)

( * ) Notice: Subject to any disclaimer, the term of this patent is extended or adjusted under 35 U.S.C. 154(b) by 0 days.

(21) Appl. No.: 16/891,474

(22) Filed: Jun. 3, 2020

(65) Prior Publication Data

US 2021/0018126 A1 Jan. 21, 2021

Related U.S. Application Data

(60) Provisional application No. 62/874,146, filed on Jul. 15, 2019.

(51) Int. Cl.
*F16L 33/30* (2006.01)
*F16L 33/00* (2006.01)

(52) U.S. Cl.
CPC .......... *F16L 33/003* (2013.01); *F16L 33/006* (2013.01); *F16L 33/30* (2013.01)

(58) Field of Classification Search
CPC ........ F16L 33/30; F16L 33/006; F16L 33/003
USPC ...................................... 285/239, 242, 12, 4
See application file for complete search history.

(56) References Cited

U.S. PATENT DOCUMENTS

| | | | | | |
|---|---|---|---|---|---|
| 2,311,708 | A | * | 2/1943 | Sundholm | F16K 3/085 251/149.8 |
| 2,449,754 | A | * | 9/1948 | Seitz | F16L 25/14 285/4 |
| 3,480,299 | A | * | 11/1969 | Henderson | F16L 15/08 285/4 |
| 4,173,989 | A | * | 11/1979 | Prest | F16L 43/02 138/109 |
| 4,238,131 | A | * | 12/1980 | Cleveland | F01P 11/06 285/38 |
| 4,266,813 | A | * | 5/1981 | Oliver | F16L 25/14 285/12 |
| 4,453,749 | A | * | 6/1984 | McKinnon | F16L 35/00 285/390 |
| 4,712,812 | A | * | 12/1987 | Weir, III | F16L 25/14 138/96 T |
| 4,722,556 | A | * | 2/1988 | Todd | F16L 25/0036 285/12 |

(Continued)

*Primary Examiner* — David Bochna
(74) *Attorney, Agent, or Firm* — Carter, DeLuca & Farrell LLP; David Lee (57) ABSTRACT

Technologies are described for devices and methods to couple a hose to another hose or apparatus. The device may comprise a first side with at least two barbed fittings, each configured to insert into a flexible hose to create a waterproof seal. A diameter of each barbed fitting may increase in size from a first end of the first side to a second end of the first side. The device may comprise a second side with at least two male fittings, each configured to threadly interact with threads of a female fitting to create a waterproof seal. A diameter of each two male fitting may increase in size from a first end of the second side to a second end of the second side. The device may comprise a separator rim attached to the second end of the first side and to the second end of the second side.

16 Claims, 4 Drawing Sheets

(56) References Cited

U.S. PATENT DOCUMENTS

| | | | | |
|---|---|---|---|---|
| 4,875,719 A * | 10/1989 | Mylett | ................ | F16L 25/14 |
| | | | | 285/239 |
| 4,971,366 A * | 11/1990 | Towsley | ............ | F16L 47/32 |
| | | | | 285/12 |
| 5,141,255 A * | 8/1992 | Hanaoka | ............ | B05B 15/65 |
| | | | | 285/4 |
| D441,435 S * | 5/2001 | Patteson | ................ | D23/262 |
| D453,817 S * | 2/2002 | Patteson | ................ | D23/262 |
| 7,722,091 B1 * | 5/2010 | Brockington | ........ | E03F 1/008 |
| | | | | 285/361 |
| 9,835,282 B2 * | 12/2017 | Boaz | .................... | E03B 7/08 |
| 10,816,119 B2 * | 10/2020 | Sinsel | ................. | F16L 33/30 |
| 2002/0167166 A1 * | 11/2002 | Klein | ................ | F16L 33/30 |
| | | | | 285/239 |
| 2003/0230894 A1 * | 12/2003 | Cleveland | ........... | F16L 33/30 |
| | | | | 285/239 |
| 2004/0155459 A1 * | 8/2004 | Katayama | .......... | F16L 31/00 |
| | | | | 285/256 |
| 2012/0248759 A1 * | 10/2012 | Feith | .................. | F16L 33/30 |
| | | | | 285/39 |

\* cited by examiner

UNIVERSAL HOSE COUPLING ADAPTER

BACKGROUND

Unless otherwise indicated herein, the materials described in this section are not prior art to the claims in this application and are not admitted to be prior art by inclusion in this section.

Hoses may provide a conduit to convey liquids, such as water, from a first point to a second point. A hose connector may connect a first section of hose to a second section of hose of the same size. A hose adapter may connect a first section of a first size hose to a second section of a second hose of a different, second size.

SUMMARY

One embodiment of the invention is a device to couple a hose to another hose or apparatus. The device may comprise a first side. The first side may include at least two barbed fittings. The at least two barbed fittings may each be configured to insert into a flexible hose to create a waterproof seal between the device and the hose. A diameter of each of the at least two barbed fittings may be different from each other and increase in size from a first end of the first side to a second end of the first side. The device may comprise a second side. The second side may include at least two male fittings. The at least two male fittings may each be configured to threadly interact with threads of a female fitting of a hose or apparatus to create a waterproof seal between the device and the female fitting. A diameter of each of the at least two male fittings may be different from each other and increase in size from a first end of the second side to a second end of the second side, The device may comprise a separator rim. The separator rim may be attached to the second end of the first side and to the second end of the second side. The separator rim may be configured to be a stopper for a connector to the first side or the second side of the device.

Another embodiment of the invention is a method to produce a device to couple a hose to another hose or apparatus. The method may comprise injection molding a first side. The first side may include at least two barbed fittings. The at least two barbed fittings may each be configured to insert into a flexible hose to create a waterproof seal between the device and the hose. A diameter of each of the at least two barbed fittings may be different from each other and increase in size from a first end of the first side to a second end of the first side. The method may comprise injection molding a second side. The second side may include a separator rim and at least two male fittings. The at least two male fittings may each be configured to threadly interact with threads of a female fitting of a hose or apparatus to create a waterproof seal between the device and the female fitting. A diameter of each of the at least two male fittings may be different from each other and increase in size from a first end of the second side to a second end of the second side. A first side of the separator rim may be at the second end of the second side. The method may comprise attaching the second end of the first side to a second side of the separator rim by heat bonding.

Another embodiment of the invention is a device to couple a hose to another hose or apparatus. The device may comprise a first side. The first side may include five barbed fittings. Each barbed fitting may be configured to insert into a flexible hose to create a waterproof seal between the device and the hose. A diameter of each barbed fitting may be different from each other barbed fitting and may increase in size from a first end of the first side to a second end of the first side. The device may comprise a second side. The second side may include four two male fittings. Each male fitting may be configured to threadly interact with threads of a female fitting of a hose or apparatus to create a waterproof seal between the device and the female fitting. A diameter of each male fitting may be different from each other male fitting and increase in size from a first end of the second side to a second end of the second side. The device may comprise a separator rim. The separator rim may be attached to the second end of the first side and to the second end of the second side. The separator rim may be configured to be a stopper for a connector to the first side or the second side of the device. The separator rim may include a notched edge. The notched edge may be configured to mate with a notched edge of a swivel female thread hub so the swivel female thread hub can be installed on a female threaded housing and have a water tight seal to the device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
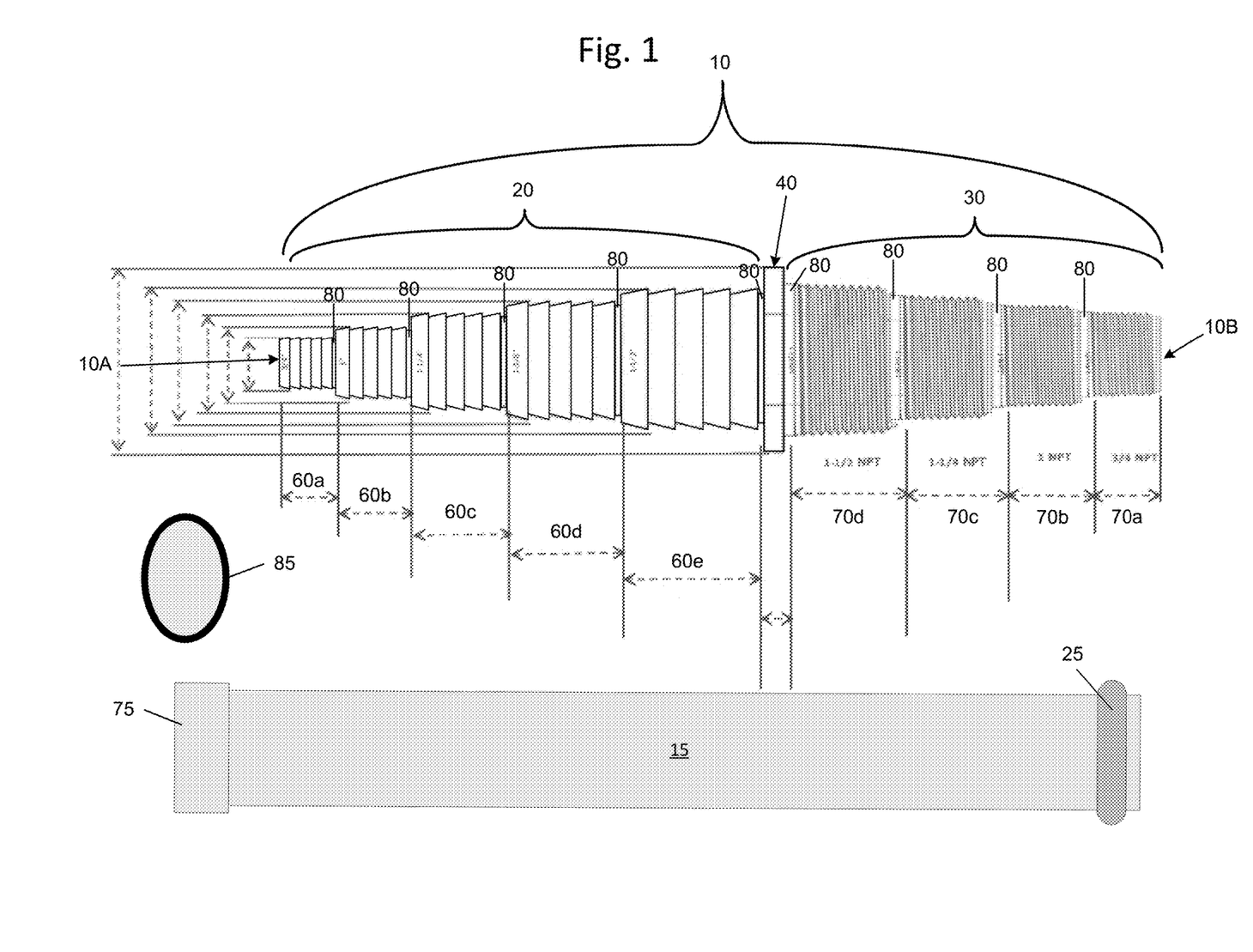
FIG. 1 is a side view of a universal hose coupling adapter.

FIG. 1 is a side view of a universal hose coupling adapter, arranged in accordance with at least some embodiments described herein. Universal hose coupling adapter 10 may include a first end 10A, a second end 10B, a first side 20, a second side 30, and a separator rim 40. First side 20 may span from first end 10A to separator rim 40. First side 20 of universal hose coupling adapter 10 may include multiple barbed fittings 60a, 60b, 60c, 60d, and 60e. Second side 30 may span from second end 10B to separator rim 40. Second side 30 of universal hose coupling adapter 10 may include multiple male fittings 70a, 70b, 70c, and 70d. Universal hose coupling adapter may be plastic including one or more of high density polyethylene (HDPE), low density polyethylene (LDPE), acrylonitrile butadiene styrene (ABS), polycarbonate (PC), polypropylene (PP), polystyrene (PS), polyvinyl chloride (PVC), acrylic, epoxy, and acetal.

Each barbed fitting 60a, 60b, 60c, 60d, and 60e may be a multiple-barbed tube. Barbs of each barbed fitting 60a, 60b, 60c, 60d, and 60e may include multiple tapered ridges. Each tapered ridge of each barbed fitting 60a, 60b, 60c, 60d, and 60e may be tapered so that a smaller end of each tapered ridge is towards a first end of first side 20 corresponding to first end 10A of universal hose coupling adapter 10, and a larger end of each tapered ridge is towards a second end of first side 20 corresponding to separator rim 40. Barbed fittings 60a, 60b, 60c, 60d, 60e may have different diameters.

A diameter of barbed fitting 60a may be smaller than a diameter of barbed fitting 60b. A diameter of barbed fitting 60b may be smaller than a diameter of barbed fitting 60c. A diameter of barbed fitting 60c may be smaller than a diameter of barbed fitting 60d. A diameter of barbed fitting 60d may be smaller than a diameter of barbed fitting 60e. Diameters of barbed fittings 60a, 60b, 60c, 60d, and 60e may increase in size from barbed fitting 60a at the first end of first side 20 to barbed fitting 60e at the second end of first side 20.

Each barbed fitting 60a, 60b, 60c, 60d, 60e may be configured to insert into a flexible hose 15 of a corresponding diameter, and friction between the multiple tapered ridges of barbed fitting 60a, 60b, 60c, 60d, 60e and an inner wall of hose 15 may create a waterproof seal between universal hose coupling adapter 10 and hose 15. A clamp 25 may be secured around hose 15 after hose 15 is connected to universal hose coupling adapter 10 to keep hose 15 from slipping off barbed fitting 60a, 60b, 60c, 60d, or 60e. Clamp 25 may be an adjustable worm gear screw clamp or other type of clamp. Diameters of barbed fittings 60a, 60b, 60c, 60d, 60e increasing from the first end of first side 20 to the second end of first side 20 may provide an end stop for a connection between hose 15 with a respective adjacent smaller size barbed fitting 60a, 60b, 60c, and 60d.

For example, in an embodiment, barbed fitting 60a may have a diameter of about 0.765 inches, barbed fitting 60b may have a diameter of about 0.995 inches, barbed fitting 60c may have a diameter of about 1.245 inches, barbed fitting 60d may have a diameter of about 1.375 inches, and barbed fitting 60e may have a diameter of about 1.495 inches.

Each male fitting 70a, 70b, 70c, and 70d of second side 30 may be configured with male threads compliant with a National Pipe Thread Taper (NPT) size. Each male fitting 70a, 70b, 70c, and 70d of second side 30 may be configured to be threaded into a corresponding female fitting 75 with female threads compliant to a National Pipe Thread Taper (NPT) size corresponding to each respective male fitting. Threads of each male fitting 70a, 70b, 70c, and 70d may be tapered and may pull corresponding female fitting 75 tight when engaged with threads of corresponding female fitting 75. Each male fitting 70a, 70b, 70c, and 70d may be configured to threadly interact with threads of corresponding female fitting 75 of hose 15 or an apparatus to create a waterproof seal between universal hose coupling adapter 10 and the female fitting.

Male fittings 70a, 70b, 70c, and 70d may have different diameters. A diameter of male fitting 70a may be smaller than a diameter of male fitting 70b. A diameter of male fitting 70b may be smaller than a diameter of male fitting 70c. A diameter of male fitting 70c may be smaller than a diameter of male fitting 70d. Diameters of male fittings 70a, 70b, 70c, and 70d may increase from male fitting 70a at a first end of second side 30 to male fitting 70d at a second end of second side 30. First end of second side 30 may correspond to second end 10B of universal hose coupling adapter 10 and second end of second side 30 may correspond to separator rim 40. Diameters of male fittings 70a, 70b, 70c, and 70d increasing from second end 10B to separator rim 40 and may provide an end stop for a connection between a corresponding female fitting 75 with the respective adjacent smaller size male fitting 70a, 70b, 70c.

For example, in an embodiment, male fitting 70a may have a diameter corresponding to threads with NPT ¾, male fitting 70b may have a diameter corresponding to threads with NPT 1, male fitting 70c may have a diameter corresponding to threads with NPT 1¼, and male fitting 70d may have a diameter corresponding to threads with NPT 1½.

Universal hose coupling adapter 10 may include score marks 80. A score mark 80 may be between adjacent barbed fittings 60a, 60b, 60c, 60d, and 60e. A score mark 80 may be between adjacent male fittings 70a, 70b, 70c, and 70d. A score mark 80 may be between barbed fitting 60e and separator rim 40. A score mark 80 may be between male fitting 70d and separator rim 40.

Each score mark 80 may be a notch within universal hose coupling adapter 10. Each score mark 80 may be configured so that a user, such as a plumber or installer, may cut universal hose coupling adapter 10 at the specific score mark 80 to remove one or more barbed fitting(s) or male fitting(s) to customize universal hose coupling adapter 10. For example, universal hose coupling adapter 10 may be used to connect hose 15 corresponding with barbed fitting 60c with female fitting 75 of an apparatus corresponding to male fitting 70b. The user may cut universal hose coupling adapter 10 at score mark 80 between adjacent barbed fittings 60b and 60c and remove barbed fittings 60a and 60b from universal hose coupling adapter 10. The user may further cut universal hose coupling adapter 10 at score mark 80 between adjacent male fittings 70a and 70b and remove male fitting 70a from universal hose coupling adapter 10. By cutting universal hose coupling adapter 10 at these score marks 80, the user may produce a customize universal hose coupling adapter 10 to connect a hose compatible with barbed fitting 60c with an apparatus compatible with male fitting 70b.

Score marks 80 may further provide a location to nest an O ring or gasket 85. Score marks 80 may be configured to position O ring or gasket 85 to form a liquid tight seal when a hose or apparatus is attached to barbed fitting 60a, 60b, 60c, 60d, 60e or male fitting 70a, 70b, 70c, and 70d. O ring or gasket 85 may be a ring shaped rubber or plastic elastic piece and may provide an internal seal to a connection between a barbed fitting 60a, 60b, 60c, 60d, 60e of universal hose coupling adapter and a hose or apparatus to prevent water from leaking out. Score marks 80 may be effective to receive 0 ring or gasket 85 so that when a connection is made O ring or gasket 85 may sit within score mark 80 between a male fitting 70a, 70b, 70c, and 70d. of universal hose coupling adapter 10 and a female thread connection to create a water tight seal. Each score mark 80 and a respective O ring or gasket 85 may also provide an end stop for a hose or apparatus attached to barbed fitting 60a, 60b, 60c, 60d, 60e or male fitting 70a, 70b, 70c, and 70d, Score marks 80 and respective O rings or gaskets 85 and may provide universal hose coupling adapter 10 with water tight seals for plumbing applications.

Separator rim 40 may be attached to the second end of first side 20 and to the second end of second side 30. Separator rim 40 may be configured to be a stopper for a connector to first side 20 or second side 30 of universal hose coupling adapter 10. Separator rim 40 may be used as a stopper for hose 15 connected to male barbed fitting 60e. Separator rim 40 may be used as a stopper for the back end for a female fitting 75 threaded to male fitting 70d. For example, in an embodiment, separator rim 40 may have a diameter of about 2.200 inches and a thickness of about 0.125 inches.

Figure 2:
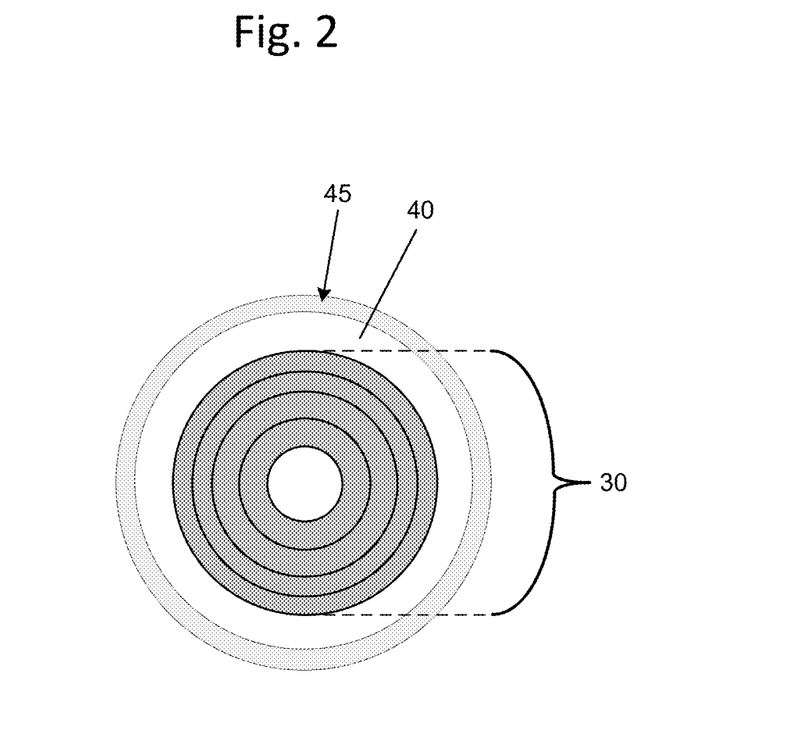
FIG. 2 is a head on view of a second side of universal hose coupling adapter.

FIG. 2 is a head on view of a second side of universal hose coupling adapter, arranged in accordance with at least some embodiments described herein. Those components in FIG. 2 that are labeled identically to components of FIG. 1 will not be described again for the purposes of brevity.

Separator rim 40 may include a step or notched edge 45. Step or notched edge 45 of separator rim 40 may be configured to be used as a housing quick connect and may mate with a step or notched edge of a swivel female thread hub so the swivel female thread hub can be installed on a threaded housing and have a water tight seal to the separator rim.

Figure 3:
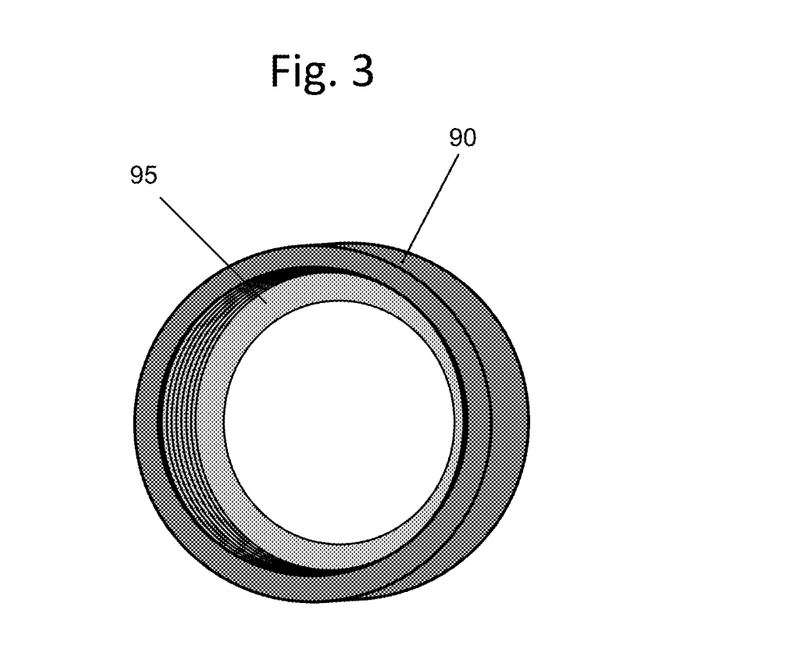
FIG. 3 is a front profile view of a female fitting connector.

FIG. 3 is a front profile view of a female fitting connector, arranged in accordance with at least some embodiments described herein. Those components in FIG. 3 that are labeled identically to components of FIGS. 1-2 will not be described again for the purposes of brevity.

Universal hose coupling adapter 10 (as shown in FIGS. 1-2) may be attachable to an apparatus or hose with a female fitting connector 90. Female fitting connector 90 may include female threading on an inner side and a flange 95. Flange 95 may have an inner diameter that is smaller than a diameter of separator rim 40 of universal hose coupling adapter 10. Female fitting connector 90 may slide over universal hose coupling adapter 10 going over either first side 20 or over second side 30 until flange 95 is in contact with separator rim 40. Flange 95 may secure female fitting connector 90 to separator rim 40 of universal hose coupling adapter 10 when female fitting connector is coupled to an apparatus or hose. Flange 95 may secure female fitting connector 90 to separator rim 40 of universal hose coupling adapter 10 from either first side 20 or second side 30 so that opposite side is capable of connecting to a hose or respective female fitting.

Figure 4:
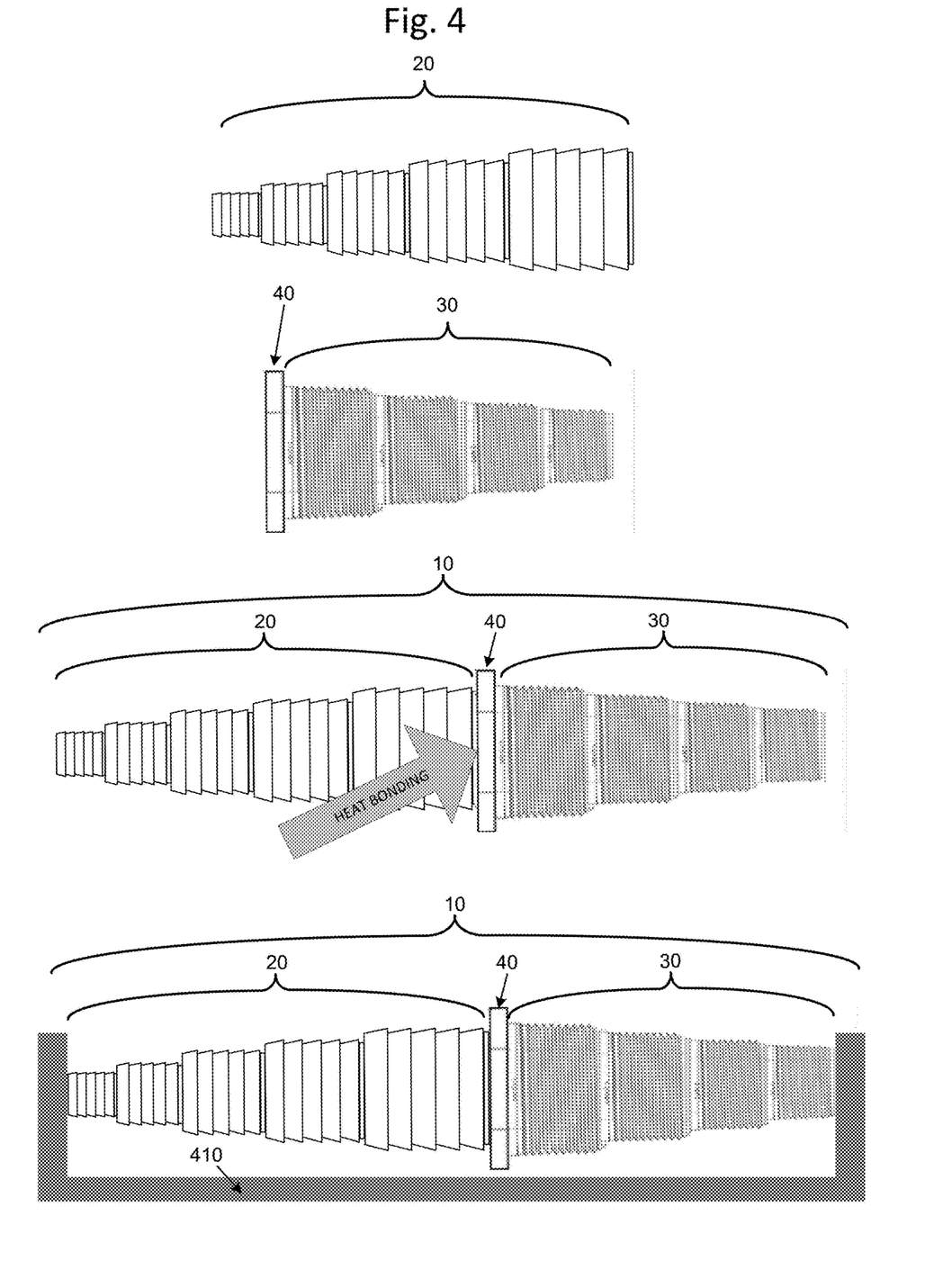
FIG. 4 is an example process to produce a universal hose coupling adapter.

FIG. 4 is an example process to produce a universal hose coupling adapter, arranged in accordance with at least some embodiments described herein. Those components in FIG. 4 that are labeled identically to components of FIGS. 1-3 will not be described again for the purposes of brevity.

Universal hose coupling adapter 10 may be produced by a multi-step process. First side 20 may be produced by injection molding. Second side 30 and separator rim 40 may be produced as a single piece by injection molding. Second side 30 and separator rim 40 may be produced separately from first side 20. Injection molded second side 30 and separator rim 40 may be injection molded with a first side of separator rim 40 in contact with, and connected to, second end of second side 30. The second end of first side 20 may be attached to a second side of separator rim 40 by heat bonding, heat welding, or ultrasonic welding. The second end of first side 20 may be held against the second side of separator rim 40 during heat bonding by a clamp 410. Clamp 410 may be in contact with the first end of first side 20 and the first end of the second side 30. Clamp 410 may clamp first side 20 to separator rim 40 and second side 30 for a period of time efficient for heat bonding to set and form a solid device.

A device in accordance with the present disclosure may allow coupling between hoses and various sump pumps, inlets pumps, and female fittings in suction and discharge applications. A device in accordance with the present disclosure may to provide an adapter for multiple hose/pump platforms. A device in accordance with the present disclosure may provide hose solutions for various equipment. A device in accordance with the present disclosure may allow connections from a hose to pond or pump equipment. A device in accordance with the present disclosure may provide a universal hose coupling adapter for hose applications. A device in accordance with the present disclosure may provide a converter for threaded hose or non-threaded hose to clamp style or barb style connectors.

Figure 5:
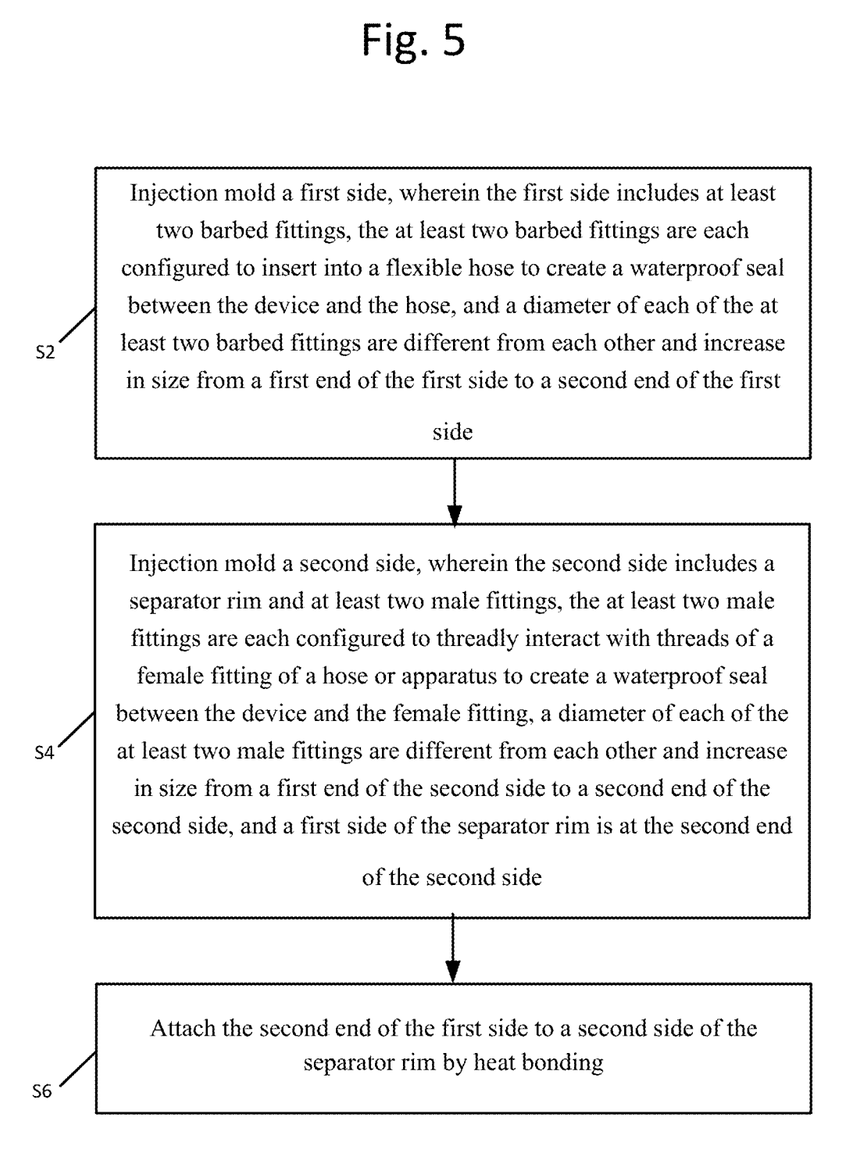
FIG. 5 illustrates a flow diagram for an example process to produce a universal hose coupling adapter, all arranged according to at least some embodiments described herein.

FIG. 5 illustrates a flow diagram for an example process to produce a universal hose coupling adapter, arranged in accordance with at least some embodiments presented herein. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation.

Processing may begin at block S2, "Injection mold a first side, wherein the first side includes at least two barbed fittings, the at least two barbed fittings are each configured to insert into a flexible hose to create a waterproof seal between the device and the hose, and a diameter of each of the at least two barbed fittings are different from each other and increase in size from a first end of the first side to a second end of the first side". At block S2, a first side may be injection molded. The first side may include at least two barbed fittings. The at least two barbed fittings may each be configured to insert into a flexible hose to create a waterproof seal between the device and the hose. A diameter of each of the at least two barbed fittings may be different from each other and may increase in size from a first end of the first side to a second end of the first side.

Processing may continue from block S2 to block S4, "Injection mold a second side, wherein the second side includes a separator rim and at least two male fittings, the at least two male fittings are each configured to threadly interact with threads of a female fitting of a hose or apparatus to create a waterproof seal between the device and the female fitting, a diameter of each of the at least two male fittings are different from each other and increase in size from a first end of the second side to a second end of the second side, and a first side of the separator rim is at the second end of the second side". At block S4, a second side may be injection molded. the second side may include a separator rim and at least two male fittings. The at least two male fittings may each be configured to threadly interact with threads of a female fitting of a hose or apparatus to create a waterproof seal between the device and the female fitting. A diameter of each of the at least two male fittings may be different from each other and may increase in size from a first end of the second side to a second end of the second side. A first side of the separator rim may be at the second end of the second side.

Processing may continue from block S4 to block S6, "Attach the second end of the first side to a second side of the separator rim by heat bonding". At block S6, the second end of the first side may be heat bonded to a second side of the separator rim.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device to couple a hose to another hose or apparatus, the device comprising:
    a first side, wherein the first side includes at least two barbed fittings, the at least two barbed fittings are each configured to insert into a flexible hose to create a waterproof seal between one of the at least two barbed fittings and the hose, and a diameter of each of the at least two barbed fittings are different from each other and increase in size from a first end of the first side to a second end of the first side;
    a second side, wherein the second side includes at least two male fittings, the at least two male fittings are each configured to threadly interact with threads of a female fitting of a hose or apparatus to create a waterproof seal between the device and the female fitting, and a diameter of each of the at least two male fittings are different from each other and increase in size from a first end of the second side to a second end of the second side;
    a separator rim, wherein the separator rim is attached to the second end of the first side and to the second end of the second side, and the separator rim is configured to be a stopper for a connector to the first side or the second side of the device; and
    score marks between adjacent barbed fittings, score marks between adjacent male fittings, a score mark between the separator rim and an adjacent barbed fitting, and a score mark between the separator rim and an adjacent male fitting, wherein each score mark is configured so that a user can cut the device at the score mark to remove one or more barbed fittings or male fittings to customize the device.

2. The device of claim 1, wherein barbs of each barbed fitting include multiple tapered ridges and each tapered ridge of each barbed fitting is tapered so that a smaller end of each tapered ridge is towards the first end of the first side and a lager end of each tapered ridge is towards the second end of the first side.

3. The device of claim 1, wherein each male fitting is configured with a thread taper to be threaded into a corresponding female fitting, the thread taper configured to pull the corresponding female fitting tight when engaged with threads of the corresponding female fitting and create a waterproof seal between the device and the female fitting.

4. The device of claim 1, further comprising at least one O ring or gasket nested within a score mark.

5. The device of claim 1, further comprising an O ring or gasket nested within each score mark.

6. The device of claim 1, wherein each score mark is configured so that a user can cut the device at the score mark to remove one or more barbed fitting(s) or male fitting(s) to customize the device.

7. The device of claim 1, wherein the separator rim includes a notched edge and the notched edge is configured to mate with a notched edge of a swivel female thread hub so the swivel female thread hub can be installed on a threaded housing and have a water tight seal to the device.

8. The device of claim 1, wherein the device is plastic including one or more of high density polyethylene (HDPE), low density polyethylene (LDPE), acrylonitrile butadiene styrene (ABS), polycarbonate (PC), polypropylene (PP), polystyrene (PS), polyvinyl chloride (PVC), acrylic, epoxy, and acetal.

9. A method to produce a device to couple a hose to another hose or apparatus, the method comprising:
    injection molding a first side, wherein the first side includes at least two barbed fittings, the at least two barbed fittings are each configured to insert into a flexible hose to create a waterproof seal between the device and the hose, and a diameter of each of the at least two barbed fittings are different from each other and increase in size from a first end of the first side to a second end of the first side;
    injection molding a second side, wherein the second side includes a separator rim and at least two male fittings, the at least two male fittings are each configured to threadly interact with threads of a female fitting of a hose or apparatus to create a waterproof seal between the device and the female fitting, a diameter of each of the at least two male fittings are different from each other and increase in size from a first end of the second side to a second end of the second side, and a first side of the separator rim is at the second end of the second side; and
    attaching the second end of the first side to a second side of the separator rim by heat bonding to produce the device wherein the device further includes:
        score marks between adjacent barbed fittings, score marks between adjacent male fittings, a score mark between the separator rim and an adjacent barbed fitting, and a score mark between the separator rim and an adjacent male fitting, wherein each score mark is configured so that a user can cut the device at the score mark to remove one or more barbed fittings or male fittings to customize the device.

10. The method of claim 9, further comprising holding the second end of the first side against the second side of the separator rim during heat bonding by a clamp on the first end of first side and the first end of the second side.

11. The method of claim 9, further comprising nesting at least one O ring or gasket within the score mark.

12. The method of claim 9, wherein the device is plastic including one or more of high density polyethylene (HDPE), low density polyethylene (LDPE), acrylonitrile butadiene styrene (ABS), polycarbonate (PC), polypropylene (PP), polystyrene (PS), polyvinyl chloride (PVC), acrylic, epoxy, and acetal.

13. The method of claim 9, wherein the separator rim includes a notched edge and the notched edge is configured to mate with a notched edge of a swivel female thread hub so the swivel female thread hub can be installed on a threaded housing and have a water tight seal to the device.

14. A device to couple a hose to another hose or apparatus, the device comprising:
    a first side, wherein the first side includes five barbed fittings, each barbed fitting is configured to insert into a flexible hose to create a waterproof seal between one of the at least two barbed fittings and the hose, and a diameter of each barbed fitting is different from each other barbed fitting and increase in size from a first end of the first side to a second end of the first side;

a second side, wherein the second side includes four male fittings, each male fitting is configured to threadly interact with threads of a female fitting of a hose or apparatus to create a waterproof seal between the device and the female fitting, and a diameter of each male fitting is different from each other male fitting and increase in size from a first end of the second side to a second end of the second side;

a separator rim, wherein the separator rim is attached to the second end of the first side and to the second end of the second side, the separator rim is configured to be a stopper for a connector to the first side or the second side of the device, separator rim includes a notched edge and the notched edge is configured to mate with a notched edge of a swivel female thread hub so the swivel female thread hub can be installed on a female threaded housing and have a water tight seal to the device; and score marks between adjacent barbed fittings, score marks between adjacent male fittings, a score mark between the separator rim and an adjacent barbed fitting, and a score mark between the separator rim and an adjacent male fitting, wherein each score mark is configured so that a user can cut the device at the score mark to remove one or more barbed fittings or male fittings to customize the device.

15. The device of claim 14, wherein a first barbed fitting has a diameter of 0.765 inches, a second barbed fitting has a diameter of 0.995 inches, a third barbed fitting has a diameter of 1.245 inches, a fourth barbed fitting has a diameter of 1.375 inches, and a fifth barbed fitting has a diameter of 1.495 inches.

16. The device of claim 14, wherein each male fitting is configured with a thread taper to be threaded into a corresponding female fitting, the thread taper configured to pull the corresponding female fitting tight when engaged with threads of the corresponding female fitting, and create a waterproof seal between the device and the female fitting.

* * * * *